Patented Aug. 2, 1938

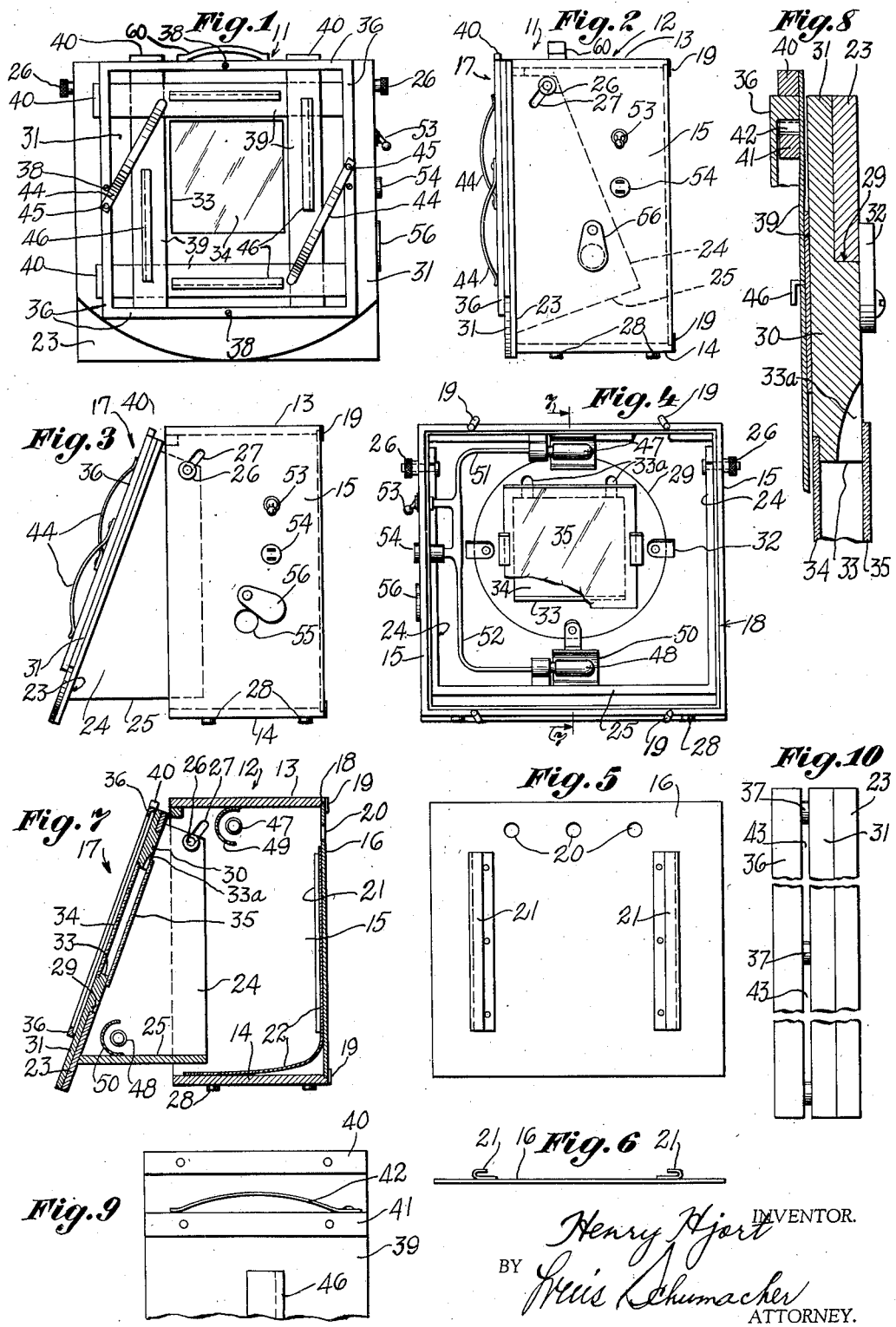
Aug. 2, 1938. H. HJORT 2,125,613
REVOLVING RETOUCHING DESK
Filed Aug. 28, 1937

2,125,613

UNITED STATES PATENT OFFICE 2,125,613

REVOLVING RETOUCHING DESK

Henry Hjort, Bay Terrace, Staten Island, N. Y.

Application August 28, 1937, Serial No. 161,356

11 Claims. (Cl. 95—102)

This invention relates to devices such as photographic retouching desks.

One object of the invention is to provide a device of the character described having an improved supporting means adapted to be angularly movable for supporting photographic elements such as positives or negatives in different positions for convenient retouching by the operator whose hand moves in a series of downward strokes.

Another object of the invention is the provision of a photographic retouching device comprising a supporting or desk member which is substantially revoluble and is furnished with shutter means for adjustably covering the negative or positive so as to expose only the part at which the retouching is to be done.

Another object is to furnish a device of the class alluded to wherein the adjustable revoluble desk member forms a part of a lighting cabinet in generally telescopic relation therewith whereby the desk member may be set up in easel-like position.

Other objects of the invention are to furnish a photographic retouching device having improved insulating window means to protect a negative from the heat of the light source; improved means for holding either positives or negatives on the revoluble desk member; improved means for holding a light diffusing and reflecting member; improved member for releasably locking the latter in the collapsed position of the desk member on the cabinet; improved means for mounting and arranging the lamps; and improved means for obtaining a limited amount of light in a photographic dark room during retouching.

A further object of the invention is the provision of a device of the nature set forth having relatively few and simple parts, and which is inexpensive to manufacture, durable, reliable, convenient and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in front elevation showing a device embodying the invention.

Fig. 2 is a view in side elevation thereof.

Fig. 3 is a view in side elevation with the desk member in easel position.

Fig. 4 is an inside view in rear elevation of the device as in Fig. 3, the rear wall of the cabinet having been removed.

Fig. 5 is a view in elevation of the inside face of the said rear wall.

Fig. 6 is an edge view thereof.

Fig. 7 is a vertical sectional view of the device in the position corresponding to Fig. 3, on line 7—7 of Fig. 4.

Fig. 8 is an enlarged fragmentary sectional view showing details of construction.

Fig. 9 is an enlarged fragmentary view in elevation of a shutter element.

Fig. 10 is an enlarged fragmentary edge view of the desk member.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 11 denotes a device embodying the invention. The same may include a cabinet having a top wall 13, a bottom wall 14, side walls 15, a rear wall 16, and a desk-like front wall structure 17. The rear wall 16 is set into rabbets 18 in the walls 13, 14, 15 and may be removably retained therein by small swingable lock plates 19 of a conventional type. Formed at an upper portion of said rear wall are a plurality of air vent openings 20. Extending along the inner face of the rear wall are mounted parallel channel guide elements 21 adapted to slidably receive and retain a discardable reflector member, such as a sheet of white light diffusing paper 22.

The front wall structure 17 is in generally swinging and telescopic relation to the main part of the cabinet 12. For this purpose it may include a wall 23 having generally triangular inward extending side walls 24 and a bottom wall 25. The walls 24 are pivotally mounted on alined set screws 26 which pass through like inclined slots 27 in the cabinet side walls 15. The arrangement is such that when the device 11 is collapsed, the desk structure 17 may be moved upward, with the set screws 26 moving along the slots 27 where they can be tightened as in Fig. 2. By reverse operation, the set screws are loosened and the desk structure drops downward while being outwardly swung as shown in Fig. 3. In this position, the wall 23 rests on a supporting surface which carries the rubber shoes 28 that elevate the main part of the cabinet somewhat above the said supporting surface. Further, it will be perceived that the walls 13, 14, 15, 23, 24, 25 cooperate to retain the light that is generated within the device 11, while the spacing of the wall 25 above the wall 14 affords an air inlet opening for ventilation in conjunction with the air vents 20.

Formed in the wall 23 is a circular opening 29 in which is journaled the disc like bearing portion 30 of a plate or wall 31, which is thus rotationally mounted on the wall 23 and secured thereto as by tabs 32 secured to the bearing portion and overlying the wall 23. Formed in the wall 31, through the bearing portion thereof, is a generally rectangular window opening 33 covered by a front glass plate 34 and a rear glass plate 35, both suitably secured to the rotary wall 31. For ventilation of the air space between the glass plates, notches 33a may be formed at the edge of the opening 33. As shown in Fig. 1, the lower edge of the wall 31 may be curved, for clearance in angularly moving the wall.

Secured on the wall or desk 31 are a plurality of angle members or guides 36. These are spaced from the walls 31 by spacers 37 as shown in Fig. 10 for a purpose hereinafter described. Preferably the angle members are attached to the wall by screws 38 which pass through the spacers into the wall 31, these screws and spacers being located so as to afford ample room for sliding adjustment of the shutter elements as hereinafter described.

The shutter structure may include four like shutter members 39 in the form of narrow plates, each having a holding structure at one end. For example, a plurality of spaced parallel rods 40, 41 may be secured to the member 39 on one face thereof, as shown in Fig. 9. On the inner or lower rod 41, I may mount a plate spring 42. In assembly, as shown in Fig. 8, one arm of the angle member 36 is received between the rods 40, 41 with the spring 42 bearing against the inner or lower face of said arm, the arrangement affording a frictional guide. The shutter member 39 passes through the clearance space between the members 31, 36. The opposite, relatively free end of the shutter member may be movable within the channel space formed by an angle 36, or within a space 43. The shutter elements successively overlap each other as shown in Fig. 1, and all these elements are similarly slidably adjustable, with the exposed rods 40 acting as finger pieces. Thus a negative may be placed on the glass plate 34, with the shutter elements overlying the negative to hold the same and expose only a desired work area.

To assure that the shutter elements shall lie snugly against the glass plate 34, I may provide bowed spring plates 44 pivotally connected at 45 to the angle members 36 so as to be swingable to bear on the shutter elements at a desired point.

For holding positives, which are generally of larger area than negatives, I may provide cooperative angle members 46 on the respective shutter elements 39. These angle members provide channel guides for holding the positives.

Any suitable source of illumination may be provided within the device 11, for instance, upper and lower lamps 47, 48. The former may be mounted, together with its reflector 49 on the top wall 13, and the latter with its reflector 50 may be mounted on the bottom wall 25 of the desk structure 17. Leads 51, 52 from the respective bulbs may connect with a switch 53 mounted on the cabinet 12. Current may be supplied to the circuit at a plug or socket 54 on the cabinet.

When the lamps 47, 48 are illuminated, all the light thereof will be thrown on the reflector 22, which is of sufficient length to substantially cover the rear wall 16 and to curve freely downward over the bottom wall 14. The reflector 22 in turn projects the light evenly upon the work through the window panes 34, 35. By positioning the lamp 48 on the swingable wall structure 17, there is ample room in the cabinet for the device 11 to be collapsed.

Sometimes external light is required as in order to permit the operator to choose retouching materials of different colors. For this purpose an opening 55 may be formed in a side wall 15 of the cabinet, this opening being closable by a swingable shutter 56.

The operation of the device will now be briefly described. It is well known to photographers that retouching is often required, since a negative may bear a blemish, scratch or the like, or some change in the photograph is desired. Likewise retouching of the positive may be necessary as the positive may show up a blemish which may be unnoticeable on the smaller negative, and of course the operator may desire to remove the appearance of a wrinkle or the like. In all such work, the operator moves his hand in a series of minute downward strokes, with a pivotal movement at the wrist or elbow. The downward movement permits of the greatest accuracy and convenience. In setting up the device 11, the operator loosens the screw 26 and swings the desk structure forward and downward about the screws 26 acting as movable pivots in conjunction with the slots 27. The desk structure is now in easel like position. A negative is placed thereon over the glass plate 34, and the shutter slides are moved over the negative by manipulating the finger pieces 40. The switch 53 is operated to turn on the bulbs 47, 48, and when the desired work area of the negative is located and exposed by the shutter, the operator begins the retouching. If the appearance of a wrinkle is to be removed which extends at an angle, the operator swings the desk member 31 about the bearing 29, 30 until the wrinkle extends substantially vertically, or otherwise, as may be desired, to permit retouching to be accomplished rapidly and accurately along the wrinkle by the short stroke action. If a positive is to be retouched, it is secured in the angle members 46, the shutter elements being moved according to the size of the positive. The apparatus is otherwise undisturbed, and remains cool, since ventilation occurs through the cabinet. The double window 34, 35 affords a heat insulating space, which may be ventilated by the openings 33a. If, in course of retouching, the operator needs light to see his materials or colors, he may open the closure 56 and obtain light through the opening 55. If desired, a handle 60 may be attached to the cabinet whereby the device may be conveniently carried from place to place.

I claim:

1. A device including a photographic retouching means comprising a lighting cabinet having an opening, a wall for said opening swingably mounted on the cabinet to move toward and away from the cabinet into easel-like position, light retaining means connected to said wall for movement into and out of the cabinet to confine the light therein, a desk member having a transparent portion, said desk member being journaled on said wall around said transparent portion for angular movement of the desk member, a shutter means including a plurality of plate-like shutter elements slidably mounted on the desk member, the latter having rail elements, the shutter elements each having guide engagement at one end with a respective one of the rail elements, said shutter elements being adapted to overlie and hold a negative on said transparent portion and to expose only a required portion of the negative, and elements on the shutter means co-operating to hold a positive over the shutter elements.

2. A device including a photographic retouching means comprising a cabinet, a light source therein, said cabinet having a movable wall, telescopic means interengaging said wall and the main body of the cabinet, movable pivotal means mounting said wall on the main body of the cabinet for combined downward and forward tilting movement of said wall into easel position, a desk member having a transparent portion, said member being journaled on said wall about said transparent portion, and means for holding photographic work on the transparent portion so as to be illuminated by said light source.

3. A device according to claim 2, wherein the movable pivotal means comprise means for locking the same to retain said wall in a required position.

4. A device including a photographic retouching means comprising a cabinet having a light source, said cabinet having a front wall, normally disposed at an angle in an easel-like manner, a desk member substantially coextensive in size with said wall and cabinet, said desk member having a transparent table portion for supporting photographic work, and bearing means extending around said transparent portion for journaling the desk member on said wall so as to permit the desk member to be angularly adjusted, said cabinet comprising a movable rear wall having angle guides for a sheet member of flexible reflecting material.

5. A device including a photographic retouching means comprising a cabinet having a light source, said cabinet having a front wall, normally disposed at an angle in an easel-like manner, a desk member substantially coextensive in size with said wall and cabinet, said desk member having a transparent table portion for supporting photographic work, and bearing means extending around said transparent portion for journaling the desk member on said wall so as to permit the desk member to be angularly adjusted, said cabinet comprising a movable rear wall having guide means, and a flexible sheet of reflecting material held by said guide means, said sheet being folded to lie along the bottom wall of the cabinet.

6. A device including a photographic retouching means comprising a cabinet having a light source, said cabinet having a front wall, normally disposed at an angle in an easel-like manner, a desk member substantially coextensive in size with said wall and cabinet, said desk member having a transparent table portion for supporting photographic work, and bearing means extending around said transparent portion for journaling the desk member on said wall so as to permit the desk member to be angularly adjusted, said bearing means comprising a hub portion formed on the desk member and journaled in an opening in said wall in alinement with said transparent portion, said hub portion having a central opening, and a transparent member covering the central opening at the inner face of the hub portion.

7. A device including a photographic retouching means comprising a cabinet having a light source, said cabinet having a front wall, normally disposed at an angle in an easel-like manner, a desk member substantially coextensive in size with said wall and cabinet, said desk member having a transparent table portion for supporting photographic work, and bearing means extending around said transparent portion for journaling the desk member on said wall so as to permit the desk member to be angularly adjusted, said transparent table portion including a plurality of spaced transparent plates affording an insulating air space therebetween.

8. A device including a photographic retouching means comprising a cabinet adapted to contain light therein, said cabinet having a main body element having an opening and a generally upright closure wall element for said opening, a desk member having a transparent portion, said desk member being journaled on said wall element about said transparent portion, said desk member being adapted for holding photographic work thereon over the transparent portion, said wall element being associated with the main body element of the cabinet for tilting movement at different angles so as to dispose said wall element at different easel positions, and movable means between the elements for preventing egress of light from the cabinet in the different easel positions of the wall element.

9. A device including a photographic retouching means comprising a cabinet adapted to contain light therein, said cabinet having a main body element having an opening and a generally upright closure wall element for said opening, a desk member having a transparent portion, said desk member being journaled on said wall element about said transparent portion, said desk member being adapted for holding photographic work thereon over the transparent portion, said wall element being associated with the main body element of the cabinet for tilting movement at different angles so as to dispose said wall element at different easel positions, and movable means between the elements for preventing egress of light from the cabinet in the different easel positions of the wall element, and means for locking the wall element in non-tilting relation in any easel position.

10. A device including a photographic retouching cabinet adapted to contain light and having a front wall having a transparent desk portion, and a rear wall for the cabinet, said rear wall having angle guides for a sheet member of light reflecting material along the inner face of said rear wall.

11. A device including a photographic retouching cabinet adapted to contain light and having means including a front wall having a transparent portion, a shutter means including a plurality of plate-like shutter elements slidably mounted on said wall, the latter having rail elements, the shutter elements each having guide engagement at one end with a respective one of the rail elements, said shutter elements being adapted to overlie and hold a photographic negative on said transparent portion and to expose only a required portion of the negative, and elements mounted on the shutter means cooperating to hold a photographic positive over the said transparent portion.

HENRY HJORT.